United States Patent Office 2,920,053
Patented Jan. 5, 1960

2,920,053

METHOD OF PREPARING A HYDROCARBON CONVERSION CATALYST

Glenn M. Webb, Western Springs, Ill., assignor to Standard Oil Company, Chicago, Ill., a corporation of Indiana No Drawing. Application December 30, 1955
Serial No. 556,410

3 Claims. (Cl. 252—466)

This invention relates to the catalytic conversion of hydrocarbons. More particularly, it relates to the hydroforming of petroleum naphthas, and to an improved catalyst therefor.

The conversion of hydrocarbons is now commonly carried out by catalytic means, and improved yields of the desired products are in general obtained thereby. Especially advantageous results are obtained in the hydroforming of petroleum naphthas to produce gasolines of improved octane number by using an alumina-supported platinum catalyst. Catalysts for this purpose ordinarily contain between about 0.05 and 1.0 weight-percent of platinum, based on dry $Al_2O_3$, and are prepared by a variety of techniques, as the art discloses. The use of such catalysts is economically feasible only because the platinum can be employed in very low concentrations, and it is important to disperse and maintain the platinum in as active a form as possible. An object of my invention is to prepare a platinum-alumina catalyst of improved activity. Another object is to effect an improvement in the catalytic conversion of hydrocarbons, and particularly in the platinum hydroforming of petroleum naphthas. Other objects will be apparent from the following description.

My invention is an improvement in the preparation of platinum-alumina catalysts from hydrous alumina compositions containing a carboxylic acid—for example, an alumina hydrosol of the type described by Heard in Re. 22,196 (October 6, 1942). It is common practice to commingle alumina of this type with a platinum-containing solution, and thereafter to dry the mixture in air to a relatively low water content, pulverize, form into pellets, and calcine. I have now discovered that a catalyst of substantially improved activity is obtained if the drying of the platinum-alumina-carboxylic acid composite is carried out in the absence or substantially complete absence of oxygen or other oxidizing substances.

Carboxylic acids, when incorporated into alumina compositions, are commonly employed as peptizing agents to convert hydrous alumina more or less completely into an alumina hydrosol. Such incorporation can be effected by a number of methods, such as by hydrolyzing aluminum acetate (thereby liberating a quantity of acetic acid, which functions as a peptizing agent), or by hydrolyzing an aluminum alkoxide in an aqueous medium of controlled acidity, or by digesting hydrous alumina in dilute acid, or the like.

Alumina hydrosols are most conveniently prepared, however, by the technique described in Heard Re. 22,196, referred to above. According to this technique, aluminum metal in the form of sheets, granules, sawdust, chips, shot, rings, irregular shapes, or the like, is subjected to amalgamation by contact with mercury or an aqueous solution of a mercury salt. The amalgamated aluminum is then digested in water in the presence of a low concentration (suitably about 1 to 10 percent by weight, calculated as acetic acid, preferably around 2 percent) of a weak organic acid as a peptizing agent, preferably a water-soluble aliphatic carboxylic acid such as formic acid, acetic acid, propionic acid, tartaric acid, succinic acid, malic acid, malonic acid, or the like, having an ionization constant below about $10^{-3}$ at 25° C. The reaction goes forward readily at ordinary or autogenous pressures and at temperatures above about 100° F., preferably between about 125 and 210° F. Thick, viscous hydrosols can be obtained at temperatures above 160° F., while relatively thin hydrosols are obtained at temperatures below 160° F. The mixture of amalgamated aluminum and acidulated water is preferably agitated in order to improve the contact of the reaction materials and to assist in breaking the layer of froth which is ordinarily formed by the hydrogen liberated in the reaction. A reflux condenser is advantageously employed to condense water and acid vapors from the emerging hydrogen stream and to return the resulting condensate to the reaction vessel. The reaction gradually slows down after about twenty-four hours and ordinarily ceases for all practical purposes after about thirty hours. The reaction product is thereafter clarified by settling, centrifugation, filtration, or the like, to remove suspended solids, including particles of metallic mercury. The hydrosol product is a syrupy liquid of opalescent, nearly transparent appearance, containing from around 2 to 10 percent by weight of $Al_2O_3$.

Another form of peptized alumina can conveniently be prepared by a modification of the Heard technique omitting the weak organic acid peptizing agent in the digestion of the amalgamated aluminum, so that a slurry of hydrous alumina is obtained, separating the hydrous alumina, and thereafter digesting the hydrous alumina with acetic acid or other weak organic acid to peptize the alumina.

In the preparation of a platinum-alumina composite, it is convenient to commingle an alumina hydrosol with an aqueous solution of a platinum compound, and to cogel the resulting mixture. The alumina hydrosol and the platinum solution should be substantially pure, and in particular should not include iron, manganese, molybdenum, nickel, cobalt, sodium, other alkali metals, or compounds thereof. The platinum is employed in the form of a platinum compound such as a chloroplatinic acid, platinum tetrachloride, platinum dichloride, ammonium chloroplatinate, a platinum-ammonia complex, a platinum-amine complex, or the like, or platinum sulfide in the form of a stable colloidal suspension prepared, for example, by commingling aqueous ammonium polysulfide with aqueous chloroplatinic acid. The mixture of platinum compound and alumina hydrosol is conveniently cogelled by drying or by adding an electrolyte such as ammonium hydroxide, ammonium carbonate, ammonium acetate, or the like. Alternatively, the alumina hydrosol can be gelled by drying or adding an electrolyte, and the resulting hydrogel can then be impregnated with a platinum-containing solution. As further alternatives, an acidulated slurry of hydrous alumina can be commingled with a platinum solution, then dried; or the hydrous alumina can be separated from such a slurry, then impregnated with platinum solution.

In accordance with my invention, a platinum-alumina-carboxylic acid composite prepared as described above is subjected to drying in the substantially complete absence of oxygen or other oxidizing substance until the carboxylic acid content has been reduced to less than about 0.5 percent by weight, calculated as acetic acid, preferably less than about 0.1 percent by weight, based on dry $Al_2O_3$. The drying may suitably be carried out in the presence of hydrogen, nitrogen, flue gas, steam, or the like, preferably at ordinary or reduced pressures, and with not more than about 1 percent by volume of oxidizing gas, preferably less than about 0.1 percent. The presence of up to 10 percent of steam is advantageous in any case, as a means of hydrolyzing any carboxylic acid compounds. The drying temperature may suitably range from about 200 to about 950° F., for example, from about 300 to 600° F. in hydrogen or a hydrogen-containing gas for about 4 to 12 hours or more, depending upon the water content desired in the dried cake. The cake is thereafter calcined in air, hydrogen, or an inert gas, such as nitrogen or flue gas at 800 to 1200° F., preferably 1000 to 1200° F., for around three to twenty-four hours to reduce the volatiles content to the desired level, e.g., less than about 50 percent by weight, wet basis, optimally between about 2 and 10 weight-percent. The calcined composite may then be crushed to pass 30 mesh, combined with a suitable pilling lubricant such as 4 percent of Sterotex, formed into pellets, and again calcined as set forth above.

The invention will be more fully understood from the following specific examples.

*Example 1*

A conventional cogelled platinum-alumina catalyst was prepared according to the following procedure, in which the drying of the platinum-alumina-carboxylic acid composite was carried out in air. A Heard-type alumina hydrosol containing 4.84 percent by weight of $Al_2O_3$ was prepared by digesting amalgamated aluminum in aqueous 2 percent acetic acid solution. A platinum dispersion was prepared by adding one milliliter of aqueous 23 percent ammonium sulfide solution to a solution of 1.65 grams of chloroplatinic acid in 500 milliliters of water. The platinum dispersion was commingled with a sufficient quantity of the alumina hydrosol to add 0.6 percent by weight of platinum thereto, based on dry $Al_2O_3$. The resulting mixture was gelled by drying in air at 250° F. for 18 hours. The dried cake was calcined in air at 950° F. for 3 hours, crushed to pass 30 mesh, combined with 4 percent of Sterotex, formed into 1/32" x 1/8" cylindrical pellets, and calcined in air at 1100° F. for 6 hours.

As an illustration of my invention for comparison with the above, a catalyst was prepared in the same manner and under the same conditions, except that the drying and pre-pelleting calcination of the platinum-alumina-carboxylic acid composite were carried out in nitrogen. The dried composite was then crushed, pelleted, and calcined in air.

The completed catalysts were subjected to hydroforming tests under standardized conditions employing 50 milliliters of catalyst in a quasi-isothermal reaction zone surrounded by an electrically heated block for temperature control. The tests were carried out at a catalyst outlet temperature of 920° F., a pressure of 200 pounds per square inch gage, an hourly weight space velocity of 2, and a once-through hydrogen rate of 5,000 standard cubic feet per barrel of feed. The feed was a Mid-Continent virgin naphtha having an ASTM distillation range of 210 to 356° F., a CFR-R octane number of 44.0, an API gravity of 55.2°, a Reid vapor pressure of 1.1 pounds per square inch, and a composition consisting of 50.0 percent by volume of paraffins, a trace of olefins, 41.5 percent naphthenes, 8.5 percent aromatics, 0.028 percent sulfur, and 0.01 percent nitrogen (Kjeldahl). The catalyst activity was calculated as the relative quantity, expressed as a percentage, of an arbitrarily chosen standard catalyst required to produce a $C_5+$ product fraction having the same octane number under the same test conditions. Comparative results of the hydroforming tests indicated that my new catalyst was greatly superior in activity:

| Product Interval, hr. | Air-Dried Catalyst | | Nitrogen-Dried Catalyst | |
|---|---|---|---|---|
| | Octane No., CFR-R | Relative Activity | Octane No., CFR-R | Relative Activity |
| 0-20 | 93.3 | 64 | 97.9 | 130 |
| 20-40 | 93.2 | 63 | 98.3 | 140 |
| 40-60 | 92.0 | 56 | 97.8 | 127 |
| 60-80 | 92.2 | 57 | 97.1 | 112 |
| 80-100 | 90.5 | 48 | 96.7 | 106 |

*Example 2*

As a further illustration of my invention, a 0.6 percent platinum-alumina catalyst was prepared according to the procedure and under the conditions of Example 1, except that the drying of the platinum-alumina-carboxylic acid composite was carried out in hydrogen up to a temperature of 950° F. A standardized hydroforming activity test revealed that this catalyst was likewise greatly superior to the comparable prior art catalyst:

| Product Interval, hr. | Octane No., CFR-R | Relative Activity |
|---|---|---|
| 0-20 | 98.1 | 141 |
| 20-40 | 97.9 | |
| 40-60 | 96.9 | 112 |

My invention is applicable broadly to the preparation of hydroforming catalysts from mixtures of platinum, alumina, and an organic acid peptizing agent as hereinabove defined. Such catalysts may optionally include additional components or adjuvants as promoters or catalyst modifiers, such as silica, a fluoride, a chloride, boria, titania, chromia, an oxide of phosphorus, vanadia, or the like. The platinum is commonly employed in a proportion between about 0.05 and 1 percent by weight, based on dry $Al_2O_3$, preferably about 0.6 percent. Additional components, such as those of the group set forth above, are commonly employed in the proportion of about 0.1 to 10 percent, based on dry $Al_2O_3$.

My improved catalyst is broadly useful in hydrocarbon-conversion reactions which are catalyzed by platinum. Specifically, my catalyst is useful for reforming, isomerization, hydrogenation, hydrocracking, dehydrogenation, oxidation, polymerization, condensation, and other reactions known in the art. The required processing conditions depend upon the specific reactions and the charging stocks involved, and may readily be determined from the teachings of the prior art. My catalyst is especially advantageous in the hydroforming of petroleum naphthas boiling in the range of about 200 to 400° F. Such naphthas are suitably contacted in the vapor phase with the catalyst at a temperature between about 800 and 1000° F., a pressure between about 100 and 1000 pounds per square inch gage, an hourly weight space velocity between about 0.5 and 10, and a hydrogen recycle rate between about 2,000 and 10,000 standard cubic feet per barrel of charging stock. Under these conditions, my catalyst is cable of upgrading a 50 percent naphthenic naphtha having a CFR-R octane number of only 40 to 50 into a $C_5+$ gasoline having an octane number of 90 to 100 in a yield of 80 to 85 percent.

While I have described my invention with reference to certain specific embodiments thereof, it is to be understood that such embodiments are illustrative only and not by way of limitation. Numerous modifications and equivalents will be apparent to those skilled in the art from the foregoing description.

In accordance with the foregoing description I claim as my invention:

1. The method of preparing a platinum-alumina catalyst, which method comprises forming an alumina hydrosol by peptizing hydrous alumina with about 1 to 10 weight percent of a water-soluble aliphatic carboxylic acid having an ionization constant below about $10^{-3}$ at 25° C., heating said hydrosol to a temperature in the range of 200 to 950° F. in the substantially complete absence of oxidizing substances and in an atmosphere selected from the class consisting of hydrogen, nitrogen, flue gas, steam and mixtures thereof, said heating being continued in said temperature range of at least four hours and until the alumina is substantially dry and the acid content thereof is reduced to less than .5 weight percent calculated as acetic acid, commingling a platinum compound with the alumina before the alumina is finally calcined, and finally calcining the dried platinum-containing material.

2. The method of claim 1 wherein the heating is continued until the carboxylic acid content of the alumina is less than 0.1 weight percent calculated as acetic acid.

3. The method of claim 1 wherein the platinum compound is commingled with the alumina while said alumina is in its hydrosol state.

References Cited in the file of this patent
UNITED STATES PATENTS

| | | |
|---|---|---|
| 2,479,109 | Haensel | Aug. 16, 1949 |
| 2,658,028 | Haensel | Nov. 3, 1953 |
| 2,662,861 | Riblett et al. | Dec. 15, 1953 |
| 2,773,846 | Stover | Dec. 11, 1956 |
| 2,777,805 | Lefrancois et al. | Jan. 15, 1957 |